United States Patent
Emonts et al.

(10) Patent No.: US 7,502,731 B2
(45) Date of Patent: *Mar. 10, 2009

(54) SYSTEM AND METHOD FOR PERFORMING SPEECH RECOGNITION BY UTILIZING A MULTI-LANGUAGE DICTIONARY

(75) Inventors: Michael Emonts, San Jose, CA (US); Xavier Menendez-Pidal, Los Gatos, CA (US); Lex Olorenshaw, Half Moon Bay, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 940 days.

This patent is subject to a terminal disclaimer.

(21) Appl. No.: 10/638,750

(22) Filed: Aug. 11, 2003

(65) Prior Publication Data
US 2005/0038654 A1 Feb. 17, 2005

(51) Int. Cl.
*G06F 17/27* (2006.01)
(52) U.S. Cl. .................... 704/9; 704/257; 704/231
(58) Field of Classification Search .......... 704/231, 704/243, 256, 257, 256.2, 242, 270, 4, 8, 704/9, 10, 251, 252, 232, 235, 246
See application file for complete search history.

(56) References Cited

U.S. PATENT DOCUMENTS

| | | | | |
|---|---|---|---|---|
| 6,085,160 | A | * 7/2000 | D'hoore et al. | 704/256.2 |
| 6,212,500 | B1 | 4/2001 | Kohler | 704/256 |
| 7,149,688 | B2 * | 12/2006 | Schalkwyk | 704/255 |
| 7,181,396 | B2 * | 2/2007 | Emonts et al. | 704/251 |

* cited by examiner

*Primary Examiner*—Huyen X. Vo
(74) *Attorney, Agent, or Firm*—Gregory J. Koerner; Redwood Patent Law

(57) ABSTRACT

The present invention comprises a system and method for speech recognition utilizing a multi-language dictionary, and may include a recognizer that is configured to compare input speech data to a series of dictionary entries from the multi-language dictionary to detect a recognized phrase or command. The multi-language dictionary may be implemented with a mixed-language technique that utilizes dictionary entries which incorporate multiple different languages such as Cantonese and English. The speech recognizer may thus advantageously achieve more accurate speech recognition accuracy in an efficient and compact manner.

40 Claims, 9 Drawing Sheets

| | |
|---|---|
| b | aa |
| d | i |
| g | u |
| p | e |
| t | o |
| k | yu |
| m | oe |
| n | eo |
| ng | a |
| f | eu |
| l | aai |
| h | aau |
| z | ai |
| c | au |
| s | ei |
| w | oi |
| j | ou |
| cl | eoi |
| sil | ui |
| | iu |

710     Optimized Cantonese Phone Set

FIG. 7

| DICTIONARY ENTRY CATEGORY | EXAMPLE |
| --- | --- |
| Cantonese | sik6 m5 sik6 dil je2 aa3 |
| English | SIT |
| Cantonese-English | caa4 ngo5 ge3 EMAIL |
| Borrowed English | haa1 lou2 |

| English Word | EMAIL |
|---|---|
| English Pronunciation | i m ei l |
| Cantonese Pronunciation | i m eu |

Fig. 9

SYSTEM AND METHOD FOR PERFORMING SPEECH RECOGNITION BY UTILIZING A MULTI-LANGUAGE DICTIONARY

BACKGROUND SECTION

1. Field of the Invention

This invention relates generally to electronic speech recognition systems, and relates more particularly to a system and method for performing speech recognition by utilizing a multi-language dictionary.

2. Description of the Background Art

Implementing a robust and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device. Electronic entertainment systems may also utilize speech recognition techniques to allow users to interact with a system by speaking to it.

However, effectively implementing such systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively recognizes words and phrases in both the Cantonese language and the English language may benefit from an efficient implementation because of the large amount and complexity of the digital data involved. Therefore, for all the foregoing reasons, implementing a robust and efficient method for a system user to interface with electronic devices remains a significant consideration of system designers and manufacturers.

SUMMARY

In accordance with the present invention, a system and method are disclosed for performing speech recognition by utilizing a multi-language dictionary. In certain embodiments, a speech recognizer may compare input speech data to dictionary entries from a dictionary that is implemented by utilizing a mixed-language technique that incorporates multiple different languages in several different dictionary entry categories. In one embodiment, the foregoing dictionary entry categories may include, but are not limited to, a Cantonese category, an English category, a mixed Cantonese-English category, and a borrowed English category.

In certain embodiments, the Cantonese category may include any appropriate words and phrases selected from the Cantonese language. Similarly, the English category may include any appropriate words and phrases selected from the English language. However, words and phrases from the English category may typically require an English-Cantonese pronunciation conversion procedure to convert the English pronunciation into a corresponding Cantonese pronunciation.

The mixed Cantonese-English category may include entries with any appropriate words selected from both the Cantonese and the English languages. In accordance with the present invention, these words from the two different languages may then be combined to create single entries in the dictionary. However, as discussed above, words from the English language may require an English-Cantonese pronunciation conversion procedure to convert the English pronunciation into a corresponding Cantonese pronunciation.

In certain embodiments, the borrowed English category may include any appropriate words from the English language that have typically become incorporated into standard daily usage by Cantonese speakers. Words in the borrowed English category typically exhibit pronunciation variations from standard English pronunciations of these same words. In practice, words from the borrowed English category may also be combined with words from the Cantonese language and/or the English language to create single entries for the dictionary.

The present invention provides a compact method for representing a multi-language dictionary by utilizing a single optimized phone set. The present invention thus utilizes the foregoing improved mixed-language speech recognition technique for implementing a multi-language dictionary to thereby provide an accurate representation of the spoken Cantonese language which typically incorporates various words and phrases from the English language. The present invention thus provides an effective system and method for performing speech recognition by utilizing a multi-language dictionary.

BRIEF DESCRIPTION OF THE DRAWINGS

FIG. 7 is a diagram of an optimized phone set, in accordance with one embodiment of the present invention;

FIG. 8 is a diagram illustrating a mixed-language speech recognition technique, in accordance with one embodiment of the present invention; and FIG. 9 is a diagram illustrating an English-Cantonese pronunciation conversion procedure, in accordance with one embodiment of the present invention.

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for speech recognition utilizing a multi-language dictionary, and may include a recognizer that is configured to compare input speech data to a series of dictionary entries from the multi-language dictionary to detect a recognized phrase or command. The multi-language dictionary may be implemented with a mixed-language technique that utilizes dictionary entries which incorporate multiple different languages such as Cantonese and English. The speech recognizer may thus advantageously achieve more accurate speech recognition accuracy in an efficient and compact manner.

Figure 1:
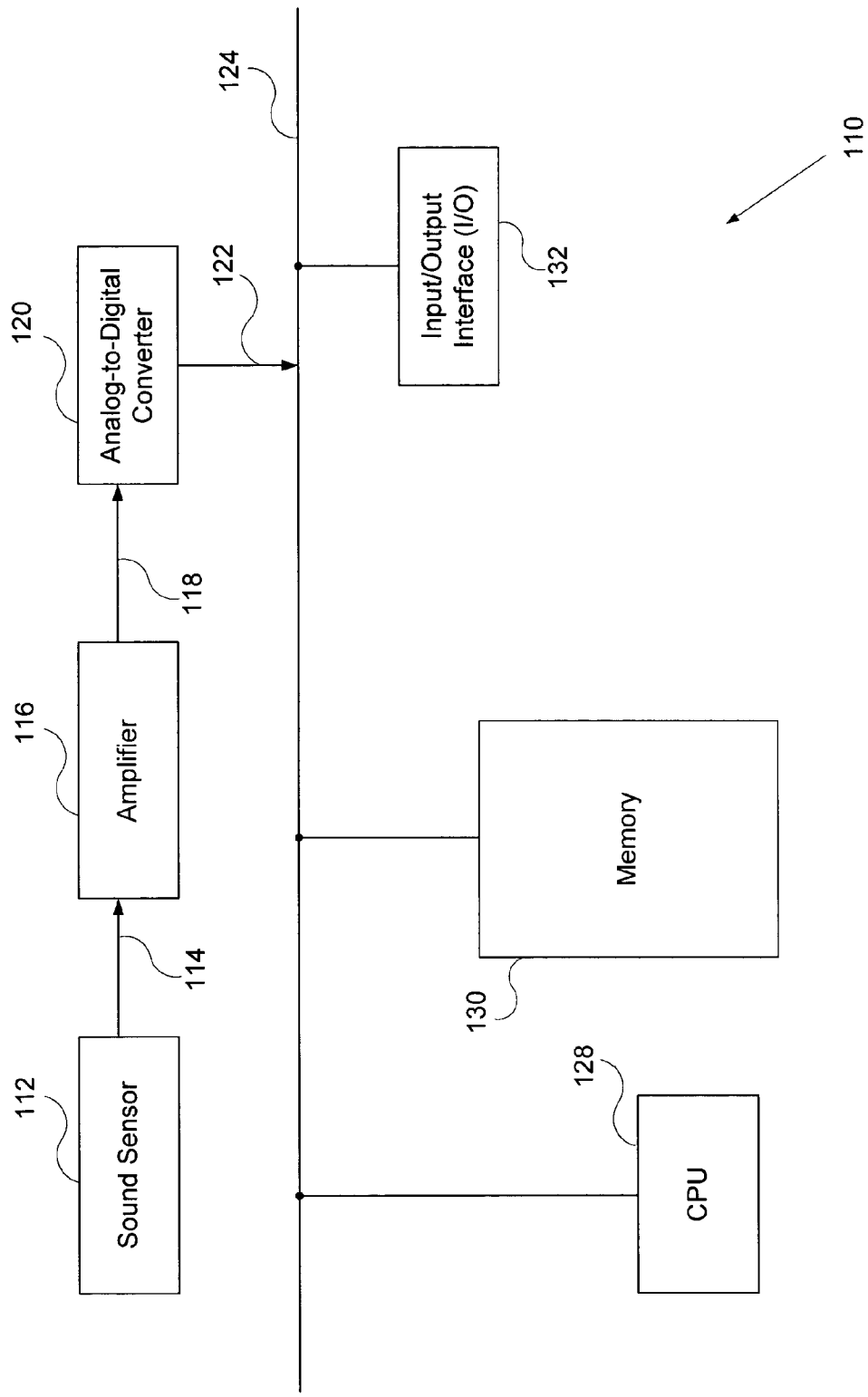
FIG. 1 is a block diagram for one embodiment of a computer system, in accordance with the present invention.

Referring now to FIG. 1, a block diagram for one embodiment of a computer system 110 is shown, according to the present invention. The FIG. 1 embodiment includes a sound sensor 112, an amplifier 116, an analog-to-digital converter 120, a central processing unit (CPU) 128, a memory 130, and an input/output interface 132. In alternate embodiments, computer system 110 may readily include various other elements or functionalities in addition to, or instead of, those elements or functionalities discussed in conjunction with the FIG. 1 embodiment.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 are further discussed below in conjunction with FIGS. 2-3. After the speech data is processed, CPU 128 may then provide the results of the speech detection analysis to other devices (not shown) via input/output interface 132. In alternate embodiments, the present invention may readily be embodied in various devices other than the computer system 110 shown in FIG. 1.

Figure 2:
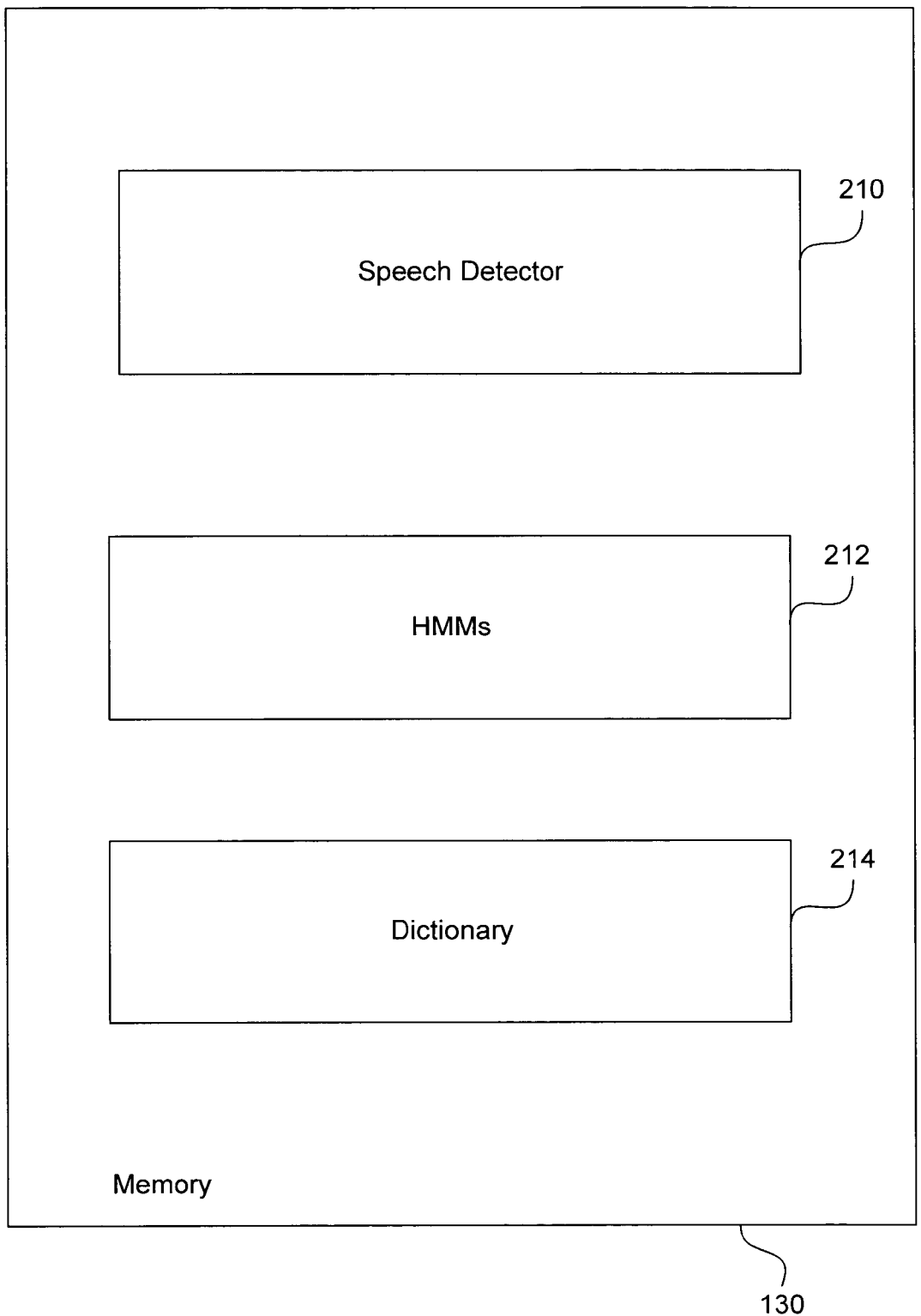
FIG. 2 is a block diagram for one embodiment of the memory of FIG. 1, in accordance with the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech detector 210, Hidden Markov Models (HMMs) 212, and a vocabulary dictionary 214. In alternate embodiments, memory 130 may readily include various other elements or functionalities in addition to, or instead of, those elements or functionalities discussed in conjunction with the FIG. 2 embodiment.

In the FIG. 2 embodiment, speech detector 210 includes a series of software modules that are executed by CPU 128 to analyze and recognize speech data, and which are further described below in conjunction with FIG. 3. In alternate embodiments, speech detector 210 may readily be implemented using various other software and/or hardware configurations. HMMs 212 and dictionary 214 may be utilized by speech detector 210 to implement the speech recognition functions of the present invention. One embodiment for HMMs 212 is further discussed below in conjunction with FIG. 4, and one embodiment for dictionary 214 is further discussed below in conjunction with FIG. 5.

Figure 3:
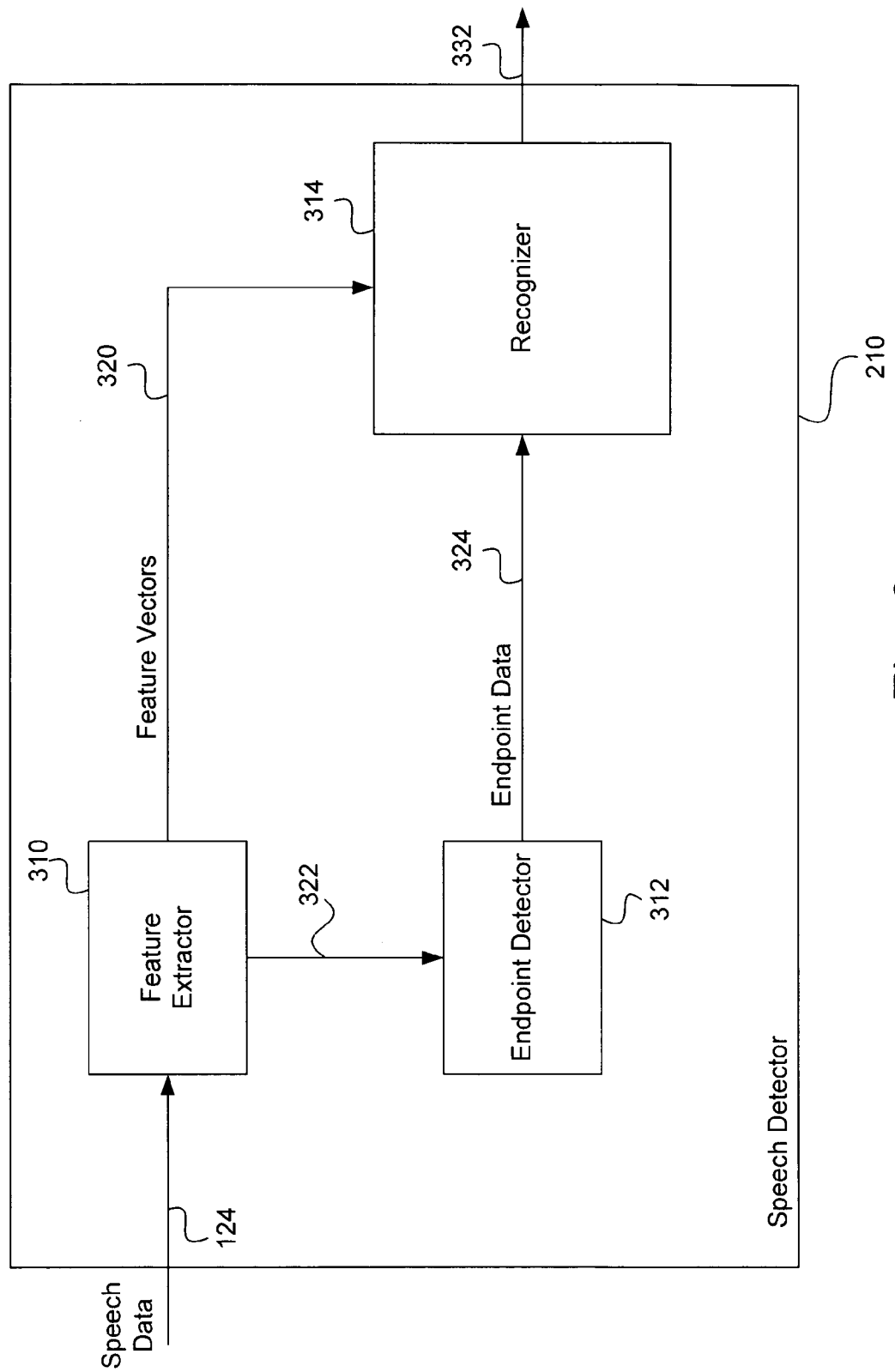
FIG. 3 is a block diagram for one embodiment of the speech detector of FIG. 2, in accordance with the present invention.

Referring now to FIG. 3, a block diagram for one embodiment of the speech detector 210 of FIG. 2 is shown, according to the present invention. Speech detector 210 includes, but is not limited to, a feature extractor 310, an endpoint detector 312, and a recognizer 314. In alternate embodiments, speech detector 210 may readily include various other elements or functionalities in addition to, or instead of, those elements or functionalities discussed in conjunction with the FIG. 3 embodiment.

In the FIG. 3 embodiment, an analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324.

Recognizer 314 is preferably configured to recognize commands in a predetermined vocabulary which is represented in dictionary 214 (FIG. 2). The foregoing vocabulary commands in dictionary 214 may correspond to any desired commands, instructions, or other communications for computer system 110. Recognized vocabulary commands may then be output to system 110 via path 332.

In practice, each command from dictionary 214 may be associated with a corresponding phone string (string of individual phones) which represents that word. Hidden Markov Models (HMMs) 212 (FIG. 2) may include trained stochastic representations for each of the phones from a pre-determined phone set that may effectively be utilized to represent the commands in dictionary 214. Recognizer 314 may then compare input feature vectors from line 320 with appropriate HMMs 212 for each of the phone strings from dictionary 214 to determine which command produces the highest recognition score. The command corresponding to the highest recognition score may thus be identified as the recognized command.

Figure 4:
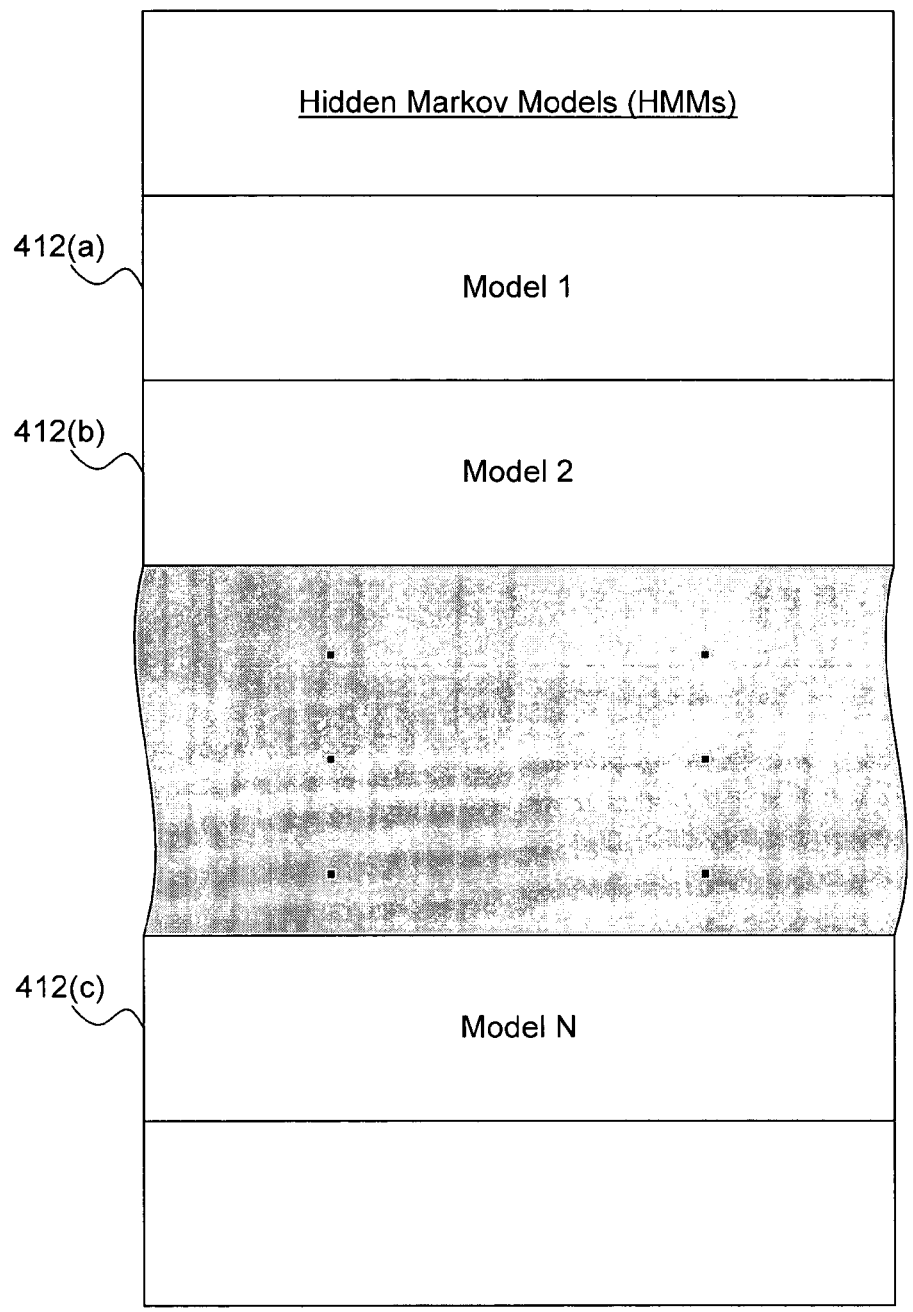
FIG. 4 is a diagram for one embodiment of the Hidden Markov Models of FIG. 2, in accordance with the present invention.

Referring now to FIG. 4, a block diagram for one embodiment of the HMMs 212 of FIG. 2 is shown, according to the present invention. In the FIG. 4 embodiment, HMMs 212 may preferably include a model 1 (412(a)) through a model N (412(c)). In alternate embodiments, HMMs 212 may readily include various other elements or functionalities in addition to, or instead of, those elements or functionalities discussed in conjunction with the FIG. 4 embodiment.

In the FIG. 4 embodiment, HMMs 212 may readily be implemented to include any desired number of models 412 that may include any required type of information. In the FIG. 5 embodiment, each model 412 from HMMs 212 may correspond to a different particular phone from a pre-determined phone set for use with recognizer 314 (FIG. 3).

Figure 5:
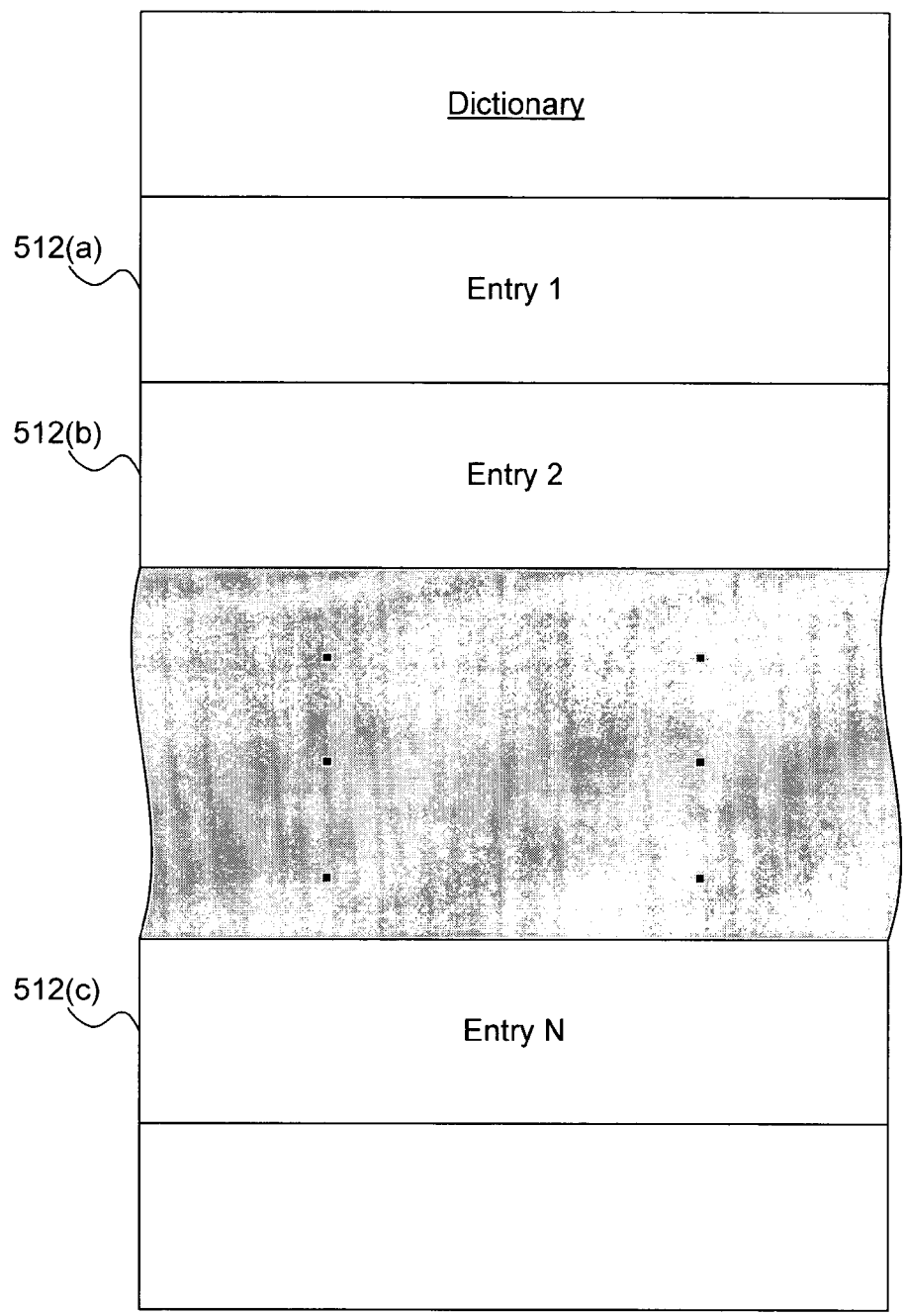
FIG. 5 is a diagram of one embodiment of the dictionary of FIG. 2, in accordance with the present invention.

Referring now to FIG. 5, a block diagram of the dictionary 214 of FIG. 2 is shown, in accordance with one embodiment of the present invention. In the FIG. 5 embodiment, dictionary 214 may preferably include an entry 1 (512(a)) through an entry N (512(c)). In alternate embodiments, dictionary 214 may readily include various other elements or functionalities in addition to, or instead of, those elements or functionalities discussed in conjunction with the FIG. 5 embodiment.

In the FIG. 5 embodiment, dictionary 214 may readily be implemented to include any desired number of entries 512 that may include any required type of information. In the FIG. 5 embodiment, as discussed above in conjunction with FIG. 3, each entry 512 from dictionary 214 may also include a corresponding phone string of individual phones from a pre-determined phone set. The individual phones of the foregoing phone string preferably form a sequential representation of the pronunciation of a corresponding word from dictionary 214. One embodiment of a dictionary entry 512 is further discussed below in conjunction with FIG. 6.

Figure 6:
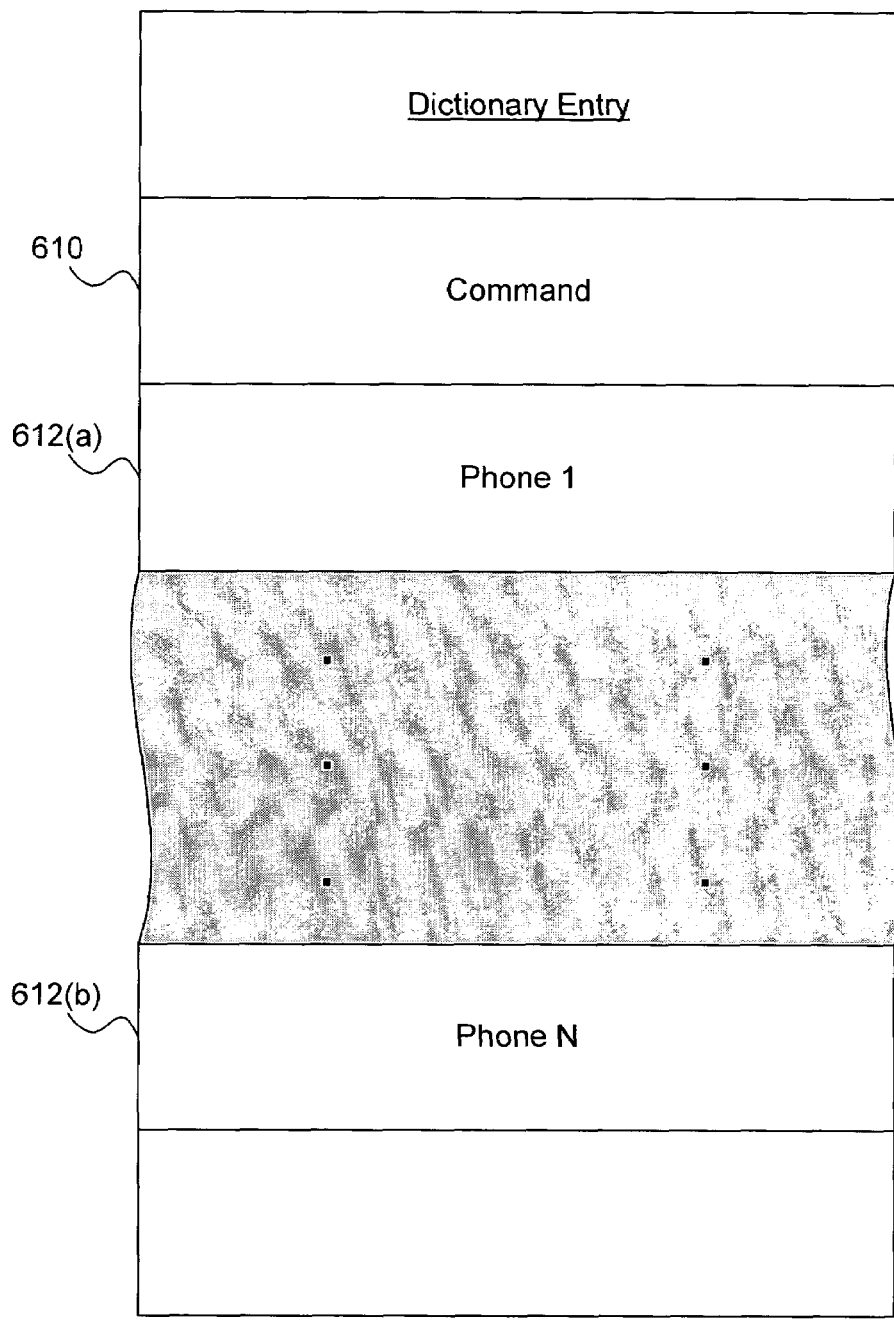
FIG. 6 is a diagram of a dictionary entry of FIG. 5, in accordance with one embodiment of the present invention.

Referring now to FIG. 6, a diagram of an exemplary FIG. 5 dictionary entry 512 is shown, in accordance with one embodiment of the present invention. In alternate embodiments, the present invention may readily perform speech recognition using dictionary entries with various other elements or functionalities in addition to, or instead of, those elements or functionalities discussed in conjunction with the FIG. 6 embodiment.

In the FIG. 6 embodiment, dictionary entry 512 may include a particular command 610 from a vocabulary that recognizer 314 (FIG. 3) is designed to recognize. In various embodiments, command 610 may be any type of utterance or speech, including a sentence, a phrase, a command, a question, or a word that may be represented according to an appropriate representation scheme. In addition, dictionary entry 512 may include a phone string that represents the sequential aural characteristics of command 610. The phone string associated with command 610 may be comprised of a series of phones from a pre-determined phone set for use with recognizer 314. In the FIG. 6 embodiment, the foregoing phone string may include a phone 1 (612(a)) through a phone N (612(a)).

For purposes of illustration, the following Table I is presented as one embodiment for dictionary 214 for the Cantonese language. Since Cantonese is typically written using Chinese characters instead of the Roman alphabet, the following Table I is presented by utilizing a Cantonese romanization scheme known as "jyutping" which has been developed by The Linguistic Society of Hong Kong (LSHK). Further information regarding "jyutping" and the Linguistic Society of Hong Kong may be found on the World Wide Web at cpct91.citvu.edu.hk/lshk.

In alternate embodiments, the present invention may utilize multi-language dictionaries that are represented in various other types of romanization schemes, including multi-language dictionaries for any other appropriate languages. One embodiment for dictionary 214 is presented below as Table I which includes commands 610 on the left side with corresponding phone strings of phones 612 on the right to represent pronunciation of the corresponding commands 610. In alternate embodiments, multi-language dictionaries may be organized in various other ways than that shown below in Table I.

TABLE I

| | |
|---|---|
| aai1_bou4: | sil aa b ou sil |
| aai1_bou4: | sil aai b ou sil |
| aai1_bou4: | sil ng aai b ou sil |
| baai1_baai3: | sil b aai b aai sil |
| baai2_go3_pou1_si2: | sil b aai g o p ou s i sil |
| bei2_jat1_go3_zi6_ngo5: | sil b ei j a t g o z i ng o sil |
| bei2_jat1_go3_zi6_ngo5: | sil b ei j a t g o z i o sil |
| caa4_ngo5_ge3_seon3: | sil c aa ng o g e i m eu sil |
| caa4_ngo5_ge3_seon3: | sil c aa ng o g e s eo n sil |
| caa4_ngo5_ge3_seon3: | sil c aa o g e i m eu sil |
| caa4_ngo5_ge3_seon3: | sil c aa o g e s eo n sil |
| caa4_seon3: | sil c aa i m eu sil |
| caa4_seon3: | sil c aa s eo n sil |
| caa4_seon3: | sil c e k i m eu sil |
| co5_dai1: | sil c o d ai sil |
| co5_dai1: | sil c o d ai l aa sil |
| co5_dai1: | sil s i cl sil |
| daa2_kyun4: | sil d aa k yu n sil |
| daa2_kyun4: | sil h eoi d aa g aau sil |
| daa2_kyun4: | sil k yu n g i cl sil |
| dai6_jat1_jip6: | sil d ai j a t j i cl sil |
| dai6_ji6_jip6: | sil d ai j i j i cl sil |
| dai6_ji6_zek3_sau2: | sil d ai j i z e k s au sil |
| dai6_ng5_jip6: | sil d ai m j i cl sil |
| dai6_ng5_jip6: | sil d ai ng j i cl sil |
| dai6_saam1_jip6: | sil d ai s aa m j i cl sil |
| dai6_sei3_jip6: | sil d ai s ei j i cl sil |
| dai6_seng1_di1_laa1: | sil d ai s e ng d i sil |
| dai6_seng1_di1_laa1: | sil d ai s e ng d i l aa sil |
| dong2_dak1_hou2: | sil d o ng d a k h ou sil |
| dong2_dak1_hou2: | sil z i p d a k h ou sil |
| duk6_dai6_jat1_jip6: | sil d u k d ai j a t j i cl sil |
| duk6_dai6_ji6_jip6: | sil d u k d ai j i j i cl sil |
| duk6_dai6_ng5_jip6: | sil d u k d ai m j i cl sil |
| duk6_dai6_ng5_jip6: | sil d u k d ai ng j i cl sil |
| duk6_dai6_saam1_jip6: | sil d u k d ai s aa m j i cl sil |
| duk6_dai6_sei3_jip6: | sil d u k d ai s ei j i cl sil |
| duk6_haa6_jat1_fung1_seon3: | sil d u k h aa j a t f u ng s eo n sil |
| duk6_haa6_jat1_fung1_seon3: | sil d u k h aa j a t g o i m eu sil |
| duk6_jyun4_seon3_gin2: | sil d u k j yu n s eo n g i n sil |
| duk6_jyun4_seon3_gin2: | sil t ai j yu n s eo n g i n sil |
| duk6_ngo5_ge3_seon3: | sil d u k ng o g e s eo n sil |
| duk6_ngo5_ge3_seon3: | sil d u k o g e s eo n sil |

TABLE I-continued

| | |
|---|---|
| duk6_seon3: | sil d u k s eo n sil |
| duk6_seon3_jing4_sik1: | sil d u k s eo n j i ng s i cl sil |
| duk6_soeng6_jat1_fung1_seon3: | sil d u k s oe ng j a t f u ng sil |
| duk6_soeng6_jat1_fung1_seon3: | sil d u k s oe ng j a t f u ng i m eu sil |
| duk6_soeng6_jat1_fung1_seon3: | sil d u k s oe ng j a t f u ng s eo n sil |
| duk6_soeng6_jat1_fung1_seon3: | sil d u k s oe ng j a t g o i m eu sil |
| faai3_di1_laa1: | sil f aai d i sil |
| faai3_di1_laa1: | sil f aai d i l aa sil |
| faai3_di1_laa1: | sil g aa c u cl sil |
| faan1_heoi3_fan3_laa1: | sil f a a n h eoi f a n l aa sil |
| faan1_heoi3_soeng5_jat1_fung1_seon3: | sil f a a n h eoi s oe ng j a t f u ng sil |
| faan1_heoi3_soeng5_jat1_fung1_seon3: | sil f a a n h eoi s oe ng j a t f u ng i m eu sil |
| faan1_heoi3_soeng5_jat1_fung1_seon3: | sil f a a n h eoi s oe ng j a t f u ng s eo n sil |
| faan1_heoi3_soeng5_jat1_fung1_seon3: | sil f a a n h eoi s oe ng j a t g o i m eu sil |
| fai6_laa1: | sil f ai l aa sil |
| fan3_jat1_zan6: | sil f a n j a t z a n sil |
| gam3_dak1_ji3_ge3: | sil g a m d a k j i g e sil |
| gam3_dak1_ji3_ge3: | sil h ou d a k j i sil |
| gam3_ho2_ngoi3_ge3: | sil g a m h o ng oi g e sil |
| gam3_ho2_ngoi3_ge3: | sil h ou h o ng oi sil |
| git3_cuk1_duk6_seon3_jing4_sik1: | sil g it c u k d u k s eo n j i ng s i cl sil |
| git3_cuk1_duk6_seon3_jing4_sik1: | sil j y u n s i ng d u k s eo n j i ng s i cl sil |
| giu3_jan4_laa1: | sil g iu j a n l aa sil |
| giu3_jan4_laa1: | sil s ei h aa l ou sil |
| giu3_jan4_laa1: | sil t u ng h eoi s ei h aa l ou sil |
| giu3_jan4_laa1: | sil t u ng k eoi s ei h aa l ou sil |
| go3_bo1_hai2_bin1_aa3: | sil g o b o h ai b i n aa sil |
| go3_bo1_hai2_bin1_aa3: | sil g o b o h ai b i n d ou aa sil |
| go3_bo1_hai2_bin1_aa3: | sil g o b o h ai b i n d ou o sil |
| go3_bo1_hai2_bin1_aa3: | sil g o b o h ai b i n o sil |
| go3_bo1_hai2_bin1_aa3: | sil g o b o h eoi z o b i n aa sil |
| go3_bo1_hai2_bin1_aa3: | sil g o b o h eoi z o b i n d ou aa sil |
| go3_bo1_hai2_bin1_aa3: | sil g o b o h eoi z o b i n d ou o sil |
| go3_bo1_hai2_bin1_aa3: | sil g o b o h eoi z o b i n o sil |
| goi2_meng2: | sil g oi m e ng sil |
| gui6_m4_gui6_aa3: | sil g u i m g ui aa sil |
| gui6_m4_gui6_aa3: | sil g u i m g ui o sil |
| gui6_m4_gui6_aa3: | sil l ei g ui m aa sil |
| gui6_m4_gui6_aa3: | sil l ei g ui m g ui aa sil |
| gui6_m4_gui6_aa3: | sil l ei g ui m g ui o sil |
| gui6_m4_gui6_aa3: | sil n ei g ui m aa sil |
| gui6_m4_gui6_aa3: | sil n ei g u i m g ui aa sil |
| gui6_m4_gui6_aa3: | sil n ei g u i m g ui o sil |
| gwaan1_gin6_ci4: | sil g w aa n g i n c i sil |
| haa6_jat1_fung1_seon3: | sil h aa j a t f u ng i m eu sil |
| haa6_jat1_fung1_seon3: | sil h aa j a t f u ng s eo n sil |
| haa6_jat1_fung1_seon3: | sil h aa j a t g o i m eu sil |
| haa6_jat1_fung1_seon3: | sil h eoi h aa j a t f u ng i m eu sil |
| haa6_jat1_fung1_seon3: | sil h eoi h aa j a t f u ng s eo n sil |
| haa6_jat1_fung1_seon3: | sil h eoi h aa j a t g o i m eu sil |
| haai1: | sil h aai sil |
| haai1: | sil l ei h ou sil |
| haai1: | sil n ei h ou sil |
| hap6_maai4_zeoi2: | sil h a p m aai g o z eoi sil |
| hap6_maai4_zeoi2: | sil h a p m aai z eoi sil |
| hei2_san1: | sil h ei s a n sil |
| hei2_san1: | sil h ei s a n aa sil |
| hei2_san1: | sil h ei s a n l aa sil |
| hei2_san1: | sil h ei s a n o sil |
| hei2_san1: | sil k ei h ei s a n sil |
| hei2_san1: | sil k ei h ei s a n aa sil |
| hei2_san1: | sil k ei h ei s a n l aa sil |
| hei2_san1: | sil k ei h ei s a n o sil |
| heoi3_haang4_haa5_laa1: | sil h aa ng h aa sil |
| heoi3_haang4_haa5_laa1: | sil h aa n h aa sil |
| heoi3_haang4_haa5_laa1: | sil h eoi h aa ng h aa l aa sil |
| heoi3_haang4_haa5_laa1: | sil h eoi h aa n h aa l aa sil |
| heoi3_waan2_laa1: | sil h eoi w aa n aa sil |
| heoi3_waan2_laa1: | sil h eoi w aa n l aa sil |
| heoi3_waan2_laa1: | sil h eoi w aa n o sil |
| heoi3_waan2_laa1: | sil w aa n aa sil |
| heoi3_waan2_laa1: | sil w aa n l aa sil |
| heoi3_waan2_laa1: | sil w aa n o sil |
| heoi3_zap1_bo1_laa1: | sil f aai d i h eoi w a n g o b o l aa sil |
| heoi3_zap1_bo1_laa1: | sil h eoi d aa m b o l aa sil |
| heoi3_zap1_bo1_laa1: | sil h eoi w a n g o b o l aa sil |
| heoi3_zap1_bo1_laa1: | sil h eoi z a p b o l aa sil |
| hoeng3_cin4: | sil h aa ng h eoi c i n b i n sil |
| hoeng3_cin4: | sil h aa ng h eoi c i n m i n sil |

TABLE I-continued

| | |
|---|---|
| hoeng3_cin4: | sil h aa n h eoi c i n b i n sil |
| hoeng3_cin4: | sil h aa n h eoi c i n m i n sil |
| hoeng3_cin4: | sil h eoi c i n b i n sil |
| hoeng3_cin4: | sil h eoi c i n m i n sil |
| hoeng3_cin4: | sil h oe ng c i n sil |
| hoeng3_hau6: | sil f aa n h eoi l aa sil |
| hoeng3_hau6: | sil h eoi h au b i n sil |
| hoeng3_hau6: | sil h eoi h au m i n sil |
| hoeng3_hau6: | sil h oe ng h au sil |
| hoi1_ci2_bei2_coi3: | sil b ei c oi h oi c i sil |
| hoi1_ci2_bei2_coi3: | sil h oi c i b ei c oi sil |
| hoi1_ci2: | sil h oi c i sil |
| hou2_jai5_aa3: | sil g a m j ai g aa sil |
| hou2_jai5_aa3: | sil h ou j ai aa sil |
| hou2_jai5_aa3: | sil h ou j ai o sil |
| hung1_sau2_dou6: | sil h u ng s au d ou sil |
| jap6_kau4: | sil j a p k au sil |
| jat1_ji6_saam1_siu3: | sil j a t j i s aa m s iu sil |
| jau5_mou5_seon3_aa3: | sil j au m ou s eo n aa sil |
| jau5_mou5_seon3_aa3: | sil j au m ou s eo n o sil |
| jau5_mou5_seon3_aa3: | sil ng o j au m ou s eo n aa sil |
| jau5_mou5_seon3_aa3: | sil ng o j au m ou s eo n o sil |
| jau5_mou5_seon3_aa3: | sil o j au m ou s eo n aa sil |
| jau5_mou5_seon3_aa3: | sil o j au m ou s eo n o sil |
| jau5_mou5_si6_aa3: | sil d i m aa sil |
| jau5_mou5_si6_aa3: | sil d i m o sil |
| jau5_mou5_si6_aa3: | sil j au m ou s i aa sil |
| jau5_mou5_si6_aa3: | sil j au m ou s i o sil |
| jau5_mou5_si6_aa3: | sil l ei d i m aa sil |
| jau5_mou5_si6_aa3: | sil l ei d i m o sil |
| jau5_mou5_si6_aa3: | sil l ei j au m ou s i aa sil |
| jau5_mou5_si6_aa3: | sil l ei j au m ou s i o sil |
| jau5_mou5_si6_aa3: | sil l ei m ou s i a m aa sil |
| jau5_mou5_si6_aa3: | sil n ei d i m aa sil |
| jau5_mou5_si6_aa3: | sil n ei d i m o sil |
| jau5_mou5_si6_aa3: | sil n ei j au m ou s i aa sil |
| jau5_mou5_si6_aa3: | sil n ei j au m ou s i o sil |
| jau5_mou5_si6_aa3: | sil n ei m ou s i a m aa sil |
| jau6_min6: | sil h eoi j au b i n sil |
| jau6_min6: | sil h eoi j au m i n sil |
| jau6_min6: | sil j au b i n sil |
| jau6_min6: | sil j au m i n sil |
| ji4_gaa1_gei2_dim2_aa3: | sil j i g aa g ei d i m sil |
| ji4_gaa1_gei2_dim2_aa3: | sil j i g aa g ei d i m aa sil |
| ji4_gaa1_gei2_dim2_aa3: | sil j i g aa g ei d i m o sil |
| ji4_gaa1_gei2_dim2_aa3: | sil j i g aa g ei d i m z u ng sil |
| ji4_gaa1_gei2_dim2_aa3: | sil j i g aa g ei d i m z u ng aa sil |
| ji4_gaa1_gei2_dim2_aa3: | sil j i g aa g ei d i m z u ng o sil |
| jing2_soeng2_laa1: | sil j i ng s oe ng sil |
| jing2_soeng2_laa1: | sil j i ng s oe ng aa sil |
| jing2_soeng2_laa1: | sil j i ng s oe ng l aa sil |
| jing2_soeng2_laa1: | sil j i ng s oe ng o sil |
| jing2_soeng2_laa1: | sil j i ng z oe ng s oe ng sil |
| jiu3_heoi3_fan3_laa3: | sil j iu f a n g aau l aa sil |
| jiu3_heoi3_fan3_laa3: | sil j iu h eoi f a n l aa sil |
| jiu3_m4_jiu3_caa1_din6_aa3: | sil j iu c aa d i n m aa sil |
| jiu3_m4_jiu3_caa1_din6_aa3: | sil j iu m j iu c aa d i n aa sil |
| jiu3_m4_jiu3_caa1_din6_aa3: | sil j iu m j iu c aa d i n o sil |
| laa6_tei1: | sil l aa t ei sil |
| laang5_zing6_di1_laa1: | sil l aa ng z i ng d i l aa sil |
| laang5_zing6_di1_laa1: | sil l aa n z i ng d i l aa sil |
| ling6_zyun3_min6: | sil l i ng z yu n m i n sil |
| ling6_zyun3_min6: | sil l i ng z yu n s a n sil |
| ling6_zyun3_min6: | sil z yu n w aa n sil |
| m4_goi1: | sil d o z e sil |
| m4_goi1: | sil m g oi sil |
| m4_goi1: | sil m g oi s aai sil |
| m4_hou2_cou4_laa1: | sil m h ou c ou l aa sil |
| m4_hou2_cou4_laa1: | sil s au s e ng l aa sil |
| m4_hou2_cou4_laa1: | sil z i ng d i l aa sil |
| m4_hou2_fai6_laa1: | sil m h ou f ai l aa sil |
| m4_zeon2_aa3: | sil m d a cl sil |
| m4_zeon2_aa3: | sil m h o j i sil |
| m4_zeon2_aa3: | sil m h ou g a m j ai l aa sil |
| m4_zeon2_aa3: | sil m z eo n aa sil |
| m4_zeon2_aa3: | sil m z eo n g a m j oe ng sil |
| m4_zeon2_aa3: | sil m z eo n o sil |
| maa1_kaa6_won4: | sil m aa k aa w o n sil |
| maak3_daai6_hau2: | sil d aa h oi sil |

TABLE I-continued

| | |
|---|---|
| maak3_daai6_hau2: | sil m aa k d aai h au sil |
| maak3_daai6_hau2: | sil m aa k d aai h au aa sil |
| maak3_daai6_hau2: | sil m aa k d aai h au o sil |
| maan5_ngon1: | sil m aa n ng o n sil |
| maan5_ngon1: | sil m aa n o n sil |
| nei5_gei2_seoi3_aa3: | sil l ei g ei d o s eoi aa sil |
| nei5_gei2_seoi3_aa3: | sil l ei g ei d o s eoi o sil |
| nei5_gei2_seoi3_aa3: | sil l ei g ei s eoi aa sil |
| nei5_gei2_seoi3_aa3: | sil l ei g ei s eoi o sil |
| nei5_gei2_seoi3_aa3: | sil n ei g ei d o s eoi aa sil |
| nei5_gei2_seoi3_aa3: | sil n ei g ei d o s eoi o sil |
| nei5_gei2_seoi3_aa3: | sil n ei g ei s eoi aa sil |
| nei5_gei2_seoi3_aa3: | sil n ei g ei s eoi o sil |
| nei5_giu3_mat1_je5_meng2_aa3: | sil l ei g iu m a t j e m e ng aa sil |
| nei5_giu3_mat1_je5_meng2_aa3: | sil l ei g iu m a t j e m e ng o sil |
| nei5_giu3_mat1_je5_meng2_aa3: | sil n ei g iu m a t j e m e ng aa sil |
| nei5_giu3_mat1_je5_meng2_aa3: | sil n ei g iu m a t j e m e ng o sil |
| ngaak1_sau2: | sil aa k aa k s au sil |
| ngaak1_sau2: | sil aa k ng aa k s au sil |
| ngaak1_sau2: | sil aa k s au sil |
| ngaak1_sau2: | sil aa k s au l aa sil |
| ngaak1_sau2: | sil ng aa k aa k s au sil |
| ngaak1_sau2: | sil ng aa k ng aa k s au sil |
| ngaak1_sau2: | sil ng aa k s au sil |
| ngaak1_sau2: | sil ng aa k s au l aa sil |
| ngaap3: | sil aa cl sil |
| ngaap3: | sil ng aa cl sil |
| ngo5_dei6_waan3_lo4: | sil ng o d ei w aa n l aa sil |
| ngo5_dei6_waan3_lo4: | sil ng o d ei w aa n l o sil |
| ngo5_dei6_waan3_lo4: | sil o d ei w aa n l aa sil |
| ngo5_dei6_waan3_lo4: | sil o d ei w aa n l o sil |
| ngo5_hai2_dou6_aa3: | sil l i d ou aa sil |
| ngo5_hai2_dou6_aa3: | sil l i d ou o sil |
| ngo5_hai2_dou6_aa3: | sil ng o h ai d ou aa sil |
| ngo5_hai2_dou6_aa3: | sil ng o h ai d ou o sil |
| ngo5_hai2_dou6_aa3: | sil ng o h ai l i d ou aa sil |
| ngo5_hai2_dou6_aa3: | sil ng o h ai l i d ou o sil |
| ngo5_hai2_dou6_aa3: | sil ng o h ai n i d ou aa sil |
| ngo5_hai2_dou6_aa3: | sil ng o h ai n i d ou o sil |
| ngo5_hai2_dou6_aa3: | sil n i d ou aa sil |
| ngo5_hai2_dou6_aa3: | sil n i d ou o sil |
| ngo5_hai2_dou6_aa3: | sil o h ai d ou aa sil |
| ngo5_hai2_dou6_aa3: | sil o h ai d ou o sil |
| ngo5_hai2_dou6_aa3: | sil o h ai l i d ou aa sil |
| ngo5_hai2_dou6_aa3: | sil o h ai l i d ou o sil |
| ngo5_hai2_dou6_aa3: | sil o h ai n i d ou aa sil |
| ngo5_hai2_dou6_aa3: | sil o h ai n i d ou o sil |
| ngo5_hou2_zung1_ji3_nei5: | sil ng o h ou z u ng j i l ei sil |
| ngo5_hou2_zung1_ji3_nei5: | sil ng o h ou z u ng j i n ei sil |
| ngo5_hou2_zung1_ji3_nei5: | sil ng o z a n h ai z u ng j i l ei sil |
| ngo5_hou2_zung1_ji3_nei5: | sil ng o z a n h ai z u ng j i n ei sil |
| ngo5_hou2_zung1_ji3_nei5: | sil ng o z u ng j i l ei sil |
| ngo5_hou2_zung1_ji3_nei5: | sil ng o z u ng j i n ei sil |
| ngo5_hou2_zung1_ji3_nei5: | sil o h ou z u ng j i l ei sil |
| ngo5_hou2_zung1_ji3_nei5: | sil o h ou z u ng j i n ei sil |
| ngo5_hou2_zung1_ji3_nei5: | sil o z a n h ai z u ng j i l ei sil |
| ngo5_hou2_zung1_ji3_nei5: | sil o z a n h ai z u ng j i n ei sil |
| ngo5_hou2_zung1_ji3_nei5: | sil o z u ng j i l ei sil |
| ngo5_hou2_zung1_ji3_nei5: | sil o z u ng j i n ei sil |
| paa1_hai2_dou6: | sil f a n d ai sil |
| paa1_hai2_dou6: | sil f a n d ai l aa sil |
| paa1_hai2_dou6: | sil p aa h ai d ou sil |
| paa1_hai2_dou6: | sil t aa n h ai d ou sil |
| pui4_ngo5_king1_haa5_gaai2_a2: | sil k i ng h aa g aai l o sil |
| pui4_ngo5_king1_haa5_gaai2_a2: | sil ng o d ei k i ng h aa g aai l o sil |
| pui4_ngo5_king1_haa5_gaai2_a2: | sil o d ei k i ng h aa g aai l o sil |
| pui4_ngo5_king1_haa5_gaai2_a2: | sil p ui ng o k i ng h aa g aai a sil |
| pui4_ngo5_king1_haa5_gaai2_a2: | sil p ui o k i ng h aa g aai a sil |
| saan3_maai4: | sil s aa n m aai sil |
| sai2_m4_sai2_hap1_haa5_aa3: | sil f a n m f a n h aa aa sil |
| sai2_m4_sai2_hap1_haa5_aa3: | sil f a n m f a n h aa o sil |
| sai2_m4_sai2_hap1_haa5_aa3: | sil j iu f a n g aa u m aa sil |
| sai2_m4_sai2_hap1_haa5_aa3: | sil j iu f a n h aa m aa sil |
| sai2_m4_sai2_hap1_haa5_aa3: | sil j iu h a p h aa m aa sil |
| sai2_m4_sai2_hap1_haa5_aa3: | sil j iu m j iu f a n g aau aa sil |
| sai2_m4_sai2_hap1_haa5_aa3: | sil j iu m j iu f a n g aau o sil |
| sai2_m4_sai2_hap1_haa5_aa3: | sil j iu m j iu h a p h aa aa sil |
| sai2_m4_sai2_hap1_haa5_aa3: | sil j iu m j iu h a p h aa o sil |
| sai2_m4_sai2_hap1_haa5_aa3: | sil l ei j iu f a n g aau m aa sil |

TABLE I-continued

| | |
|---|---|
| sai2_m4_sai2_hap1_haa5_aa3: | sil l ei j iu h a p h aa m aa sil |
| sai2_m4_sai2_hap1_haa5_aa3: | sil l ei j iu m j iu f a n g aau aa sil |
| sai2_m4_sai2_hap1_haa5_aa3: | sil l ei j iu m j iu f a n g aau o sil |
| sai2_m4_sai2_hap1_haa5_aa3: | sil l ei j iu m j iu h a p h aa aa sil |
| sai2_m4_sai2_hap1_haa5_aa3: | sil l ei j iu m j iu h a p h aa o sil |
| sai2_m4_sai2_hap1_haa5_aa3: | sil n ei j iu f a n g aau m aa sil |
| sai2_m4_sai2_hap1_haa5_aa3: | sil n ei j iu h a p h aa m aa sil |
| sai2_m4_sai2_hap1_haa5_aa3: | sil n ei j iu m j iu f a n g aau aa sil |
| sai2_m4_sai2_hap1_haa5_aa3: | sil n ei j iu m j iu f a n g aau o sil |
| sai2_m4_sai2_hap1_haa5_aa3: | sil n ei j iu m j iu h a p h aa aa sil |
| sai2_m4_sai2_hap1_haa5_aa3: | sil n ei j iu m j iu h a p h aa o sil |
| sai2_m4_sai2_hap1_haa5_aa3: | sil s ai m s ai f a n g aau aa sil |
| sai2_m4_sai2_hap1_haa5_aa3: | sil s ai m s ai f a n g aau o sil |
| sai2_m4_sai2_hap1_haa5_aa3: | sil s ai m s ai f a n h aa aa sil |
| sai2_m4_sai2_hap1_haa5_aa3: | sil s ai m s ai f a n h aa o sil |
| sai2_m4_sai2_hap1_haa5_aa3: | sil s ai m s ai h a p h aa aa sil |
| sai2_m4_sai2_hap1_haa5_aa3: | sil s ai m s ai h a p h aa o sil |
| sai2_m4_sai2_hap1_haa5_aa3: | sil s ai m s ai t au h aa aa sil |
| sai2_m4_sai2_hap1_haa5_aa3: | sil s ai m s ai t au h aa o sil |
| sai2_m4_sai2_hap1_haa5_aa3: | sil t au m t au h aa aa sil |
| sai2_m4_sai2_hap1_haa5_aa3: | sil t au m t au h aa o sil |
| sai2_m4_sai2_jau1_sik1_aa3: | sil j iu j au s i k m aa sil |
| sai2_m4_sai2_jau1_sik1_aa3: | sil j iu m j iu j au s i k aa sil |
| sai2_m4_sai2_jau1_sik1_aa3: | sil j iu m j iu j au s i k o sil |
| sai2_m4_sai2_jau1_sik1_aa3: | sil s ai m s ai j au s i k aa sil |
| sai2_m4_sai2_jau1_sik1_aa3: | sil s ai m s ai j au s i k o sil |
| sai2_m4_sai2_sik6_faan6_aa3: | sil j iu m j iu s i k f aa n aa sil |
| sai2_m4_sai2_sik6_faan6_aa3: | sil j iu m j iu s i k f aa n o sil |
| sai2_m4_sai2_sik6_faan6_aa3: | sil j iu m j iu s i k j e aa sil |
| sai2_m4_sai2_sik6_faan6_aa3: | sil j iu m j iu s i k j e o sil |
| sai2_m4_sai2_sik6_faan6_aa3: | sil j iu s i k f aa n m aa sil |
| sai2_m4_sai2_sik6_faan6_aa3: | sil j iu s i k j e m aa sil |
| sai2_m4_sai2_sik6_faan6_aa3: | sil s ai m s ai s i k d i j e aa sil |
| sai2_m4_sai2_sik6_faan6_aa3: | sil s ai m s ai s i k d i j e o sil |
| sai2_m4_sai2_sik6_faan6_aa3: | sil s ai m s ai s i k f aa n aa sil |
| sai2_m4_sai2_sik6_faan6_aa3: | sil s ai m s ai s i k f aa n o sil |
| sai2_m4_sai2_sik6_faan6_aa3: | sil s ai m s ai s i k j e aa sil |
| sai2_m4_sai2_sik6_faan6_aa3: | sil s ai m s ai s i k j e o sil |
| sai2_m4_sai2_sik6_faan6_aa3: | sil s i k m s i k d i j e aa sil |
| sai2_m4_sai2_sik6_faan6_aa3: | sil s i k m s i k d i j e o sil |
| se6_kau4: | sil s e k au sil |
| soeng6_jat1_fung1_seon3: | sil s oe ng j a t f u ng s eo n sil |
| soeng6_jat1_fung1_seon3: | sil s oe ng j a t g o i m eu sil |
| tek3_bo1_laa1: | sil t e cl sil |
| tek3_bo1_laa1: | sil t e k b o sil |
| tek3_bo1_laa1: | sil t e k b o l aa sil |
| tek3_bo1_laa1: | sil t e k g o b o sil |
| tek3_bo1_laa1: | sil t e k l aa sil |
| teng1_ngo5_gong2_laa1: | sil t e ng ng o g o ng sil |
| teng1_ngo5_gong2_laa1: | sil t e ng ng o g o ng l aa sil |
| teng1_ngo5_gong2_laa1: | sil t e ng o g o ng sil |
| teng1_ngo5_gong2_laa1: | sil t e ng o g o ng l aa sil |
| teng1_ngo5_gong2_laa1: | sil t e ng z yu sil |
| ting4_dai1: | sil t i ng d ai sil |
| ting4_dai1: | sil t i ng d ai l aa sil |
| ting4_dai1: | sil t i ng h ai d ou sil |
| ting4_dai1: | sil t i ng h ai d ou l aa sil |
| tiu3_mou5_laa1: | sil t iu m ou sil |
| tiu3_mou5_laa1: | sil t iu m ou l aa sil |
| tou5_m4_tou5_ngo6_aa3: | sil l ei t ou m t ou ng o aa sil |
| tou5_m4_tou5_ngo6_aa3: | sil l ei t ou m t ou ng o o sil |
| tou5_m4_tou5_ngo6_aa3: | sil l ei t ou m t ou o aa sil |
| tou5_m4_tou5_ngo6_aa3: | sil l ei t ou m t ou o o sil |
| tou5_m4_tou5_ngo6_aa3: | sil l ei t ou ng o m aa sil |
| tou5_m4_tou5_ngo6_aa3: | sil l ei t ou o m aa sil |
| tou5_m4_tou5_ngo6_aa3: | sil n ei t ou m t ou ng o aa sil |
| tou5_m4_tou5_ngo6_aa3: | sil n ei t ou m t ou ng o o sil |
| tou5_m4_tou5_ngo6_aa3: | sil n ei t ou m t ou o aa sil |
| tou5_m4_tou5_ngo6_aa3: | sil n ei t ou m t ou o o sil |
| tou5_m4_tou5_ngo6_aa3: | sil n ei t ou ng o m aa sil |
| tou5_m4_tou5_ngo6_aa3: | sil n ei t ou o m aa sil |
| tou5_m4_tou5_ngo6_aa3: | sil t ou m t ou ng o aa sil |
| tou5_m4_tou5_ngo6_aa3: | sil t ou m t ou ng o o sil |
| tou5_m4_tou5_ngo6_aa3: | sil t ou m t ou o aa sil |
| tou5_m4_tou5_ngo6_aa3: | sil t ou m t ou o o sil |
| waa6_bei2_ngo5_zi1_ji4_gaa1_gei2_dim2: | sil w aa b ei ng o z i j i g aa g ei d i m sil |
| waa6_bei2_ngo5_zi1_ji4_gaa1_gei2_dim2: | sil w aa b ei o z i j i g aa g ei d i m sil |
| zan1_hai6_dak1_ji3_laa3: | sil l ei g a m d a k j i g e sil |
| zan1_hai6_dak1_ji3_laa3: | sil n ei g a m d a k j i g e sil |

TABLE I-continued

| | |
|---|---|
| zan1__hai6__dak1__ji3__laa3: | sil z a n h ai d a k j i l aa sil |
| zan1__hai6__gwaai1__laa3: | sil l ei h ou g w aai aa sil |
| zan1__hai6__gwaai1__laa3: | sil l ei h ou g w aai o sil |
| zan1__hai6__gwaai1__laa3: | sil n ei h ou g w aai aa sil |
| zan1__hai6__gwaai1__laa3: | sil n ei h ou g w aai o sil |
| zan1__hai6__gwaai1__laa3: | sil z an h ai g w aai l aa sil |
| zan1__hai6__zeng3: | sil h ou z e ng sil |
| zan1__hai6__zeng3: | sil z a n h ai z e ng sil |
| zau2__laa3: | sil g o l ei l aa sil |
| zau2__laa3: | sil g w o l ei l aa sil |
| zau2__laa3: | sil l ei l aa sil |
| zau2__laa3: | sil ng o d ei z au l aa sil |
| zau2__laa3: | sil o d ei z au l aa sil |
| zau2__laa3: | sil z au l aa sil |
| zau6__faai3__mou5__din6__laa3: | sil z au f aai m ou d i n l aa sil |
| zek3__maau1__lei4__laa3: | sil z e k m aau l ei g a n aa sil |
| zek3__maau1__lei4__laa3: | sil z e k m aau l ei g a n o sil |
| zek3__maau1__lei4__laa3: | sil z e k m aau l ei l aa sil |
| zo2__min6: | sil h eoi z o b i n sil |
| zo2__min6: | sil h eoi z o m i n sil |
| zo2__min6: | sil z o b i n sil |
| zo2__min6: | sil z o m i n sil |
| zoi3__gong2__do1__ci3: | sil z oi g o ng d o c i sil |
| zoi3__gong2__do1__ci3: | sil z oi g o ng j a t c i sil |
| zou2__san4: | sil z ou s a n sil |
| zyun3__jau6: | sil z yu n j au sil |
| zyun3__zo2: | sil z yu n z o sil |

Referring now to FIG. 7, a diagram of an optimized Cantonese phone set 710 is shown, in accordance with one embodiment of the present invention. In alternate embodiments, the present invention may readily perform speech recognition using various other elements or functionalities in addition to, or instead of, those elements or functionalities discussed in conjunction with the FIG. 7 embodiment.

In the FIG. 7 embodiment, phone set 710 includes thirty-nine separate phones that are presented here as seventeen consonantal phones plus a closure phone "cl" and a silence phone "sil" (all shown on the left side of FIG. 7) and twenty vocalic phones including a set of diphthongs (all shown on the right side of FIG. 7). In the FIG. 7 embodiment, phone set 710 is implemented to represent phonetic sounds from the Cantonese language.

As discussed above, since Cantonese is typically written using Chinese characters instead of the Roman alphabet, the FIG. 7 phone set 710 (with the exception of a closure phone "cl" and a silence phone "sil") is presented by utilizing a Cantonese romanization scheme known as "jyutping" which has been developed by The Linguistic Society of Hong Kong (LSHK). Further information regarding "jyutping" and the Linguistic Society of Hong Kong may be found on the World Wide Web at cpct91.cityu.edu.hk/lshk. In alternate embodiments, the present invention may utilize optimized Cantonese phone sets that are represented in various other types of romanization schemes.

In the FIG. 7 embodiment, phone set 710 includes the following consonantal phones: b, d, g, p, t, k, m, n, ng, f, l, h, z, c, s, w, and j. In addition, phone set 710 also includes the following vocalic phones: aa, i, u, e, o, yu, oe, eo, a, eu, aai, aau, ai, au, ei, oi, ou, eoi, ui, and iu. In the FIG. 7 embodiment, phone set 710 also includes a closure phone "cl" and a silence phone "sil". Because of the relatively small number of phones used, phone set 710 therefore provides an efficient and compact representation of phones for accurately recognizing Cantonese speech.

The reduced number of separate phones in phone set 710 provides significant conservation of processing resources and memory in electronic system 110. In addition, the reduced number of total phones substantially decreases the burden associated with training Hidden Markov Models (HMMs) 212. However, in various alternate embodiments, the present invention may be implemented to include various additional or different phones than those shown in the FIG. 7 embodiment.

Conventional Chinese speech recognition systems typically utilize a phone set which is implemented with a sub-syllabic approach in which syllables are represented as rimes or half-syllables. In contrast, the optimized Cantonese phone set 710 of the present invention advantageously utilizes a sub-syllabic phonetic technique in which syllables are further divided into sub-units that may be represented by combinations of appropriate consonantal phones and vocalic phones to provide greater granularity to the speech representation process. Furthermore, phone set 710 represents the various sounds of the Cantonese language without utilizing corresponding tonal information as part of the different phones. In addition to providing greater flexibility, the foregoing phonetic technique also has the additional benefit of requiring fewer total phones in phone set 710. In accordance with the present invention, phone set 710 may be utilized to represent phone strings corresponding to entries 512 of dictionary 214.

The phone set 710 of FIG. 6 may be organized into various linguistic categories depending upon characteristics of the corresponding phones. For purposes of illustration, one such organization is presented below as Table II which includes categories on the left with corresponding phones from phone set 710 on the right. In alternate embodiments, phone set 710 may be organized in various ways that are different than that shown in Table II.

TABLE II

| | |
|---|---|
| non-boundary single-state: | sil, cl |
| consonant | b, d , g, p, t k m n ng f l h z c s w j |
| unaspirated-consonant | b d g m n ng f l h z s w j |
| aspirated-consonant | p t k c |
| consonantal | b d g p t k m n ng f h z c s |
| unaspirated-consonantal | b d g m n ng f h z s |

TABLE II-continued

| | |
|---|---|
| labial | b p m f w |
| alveolar | d t n l z c s |
| velar | g k ng |
| glide | w j |
| obstruent | b d g p t k f h z c s |
| unaspirated-obstruent | b d g f h z s |
| sonorant | m n ng l w j aa i u e o yu oe eo a eu aai aau ai au ei oi ou eoi ui iu |
| continuant | f l h s w j |
| strident | z c s |
| nasal | m n ng |
| fricative | f h s |
| approximant | l w j |
| affricate | z c |
| stop | b d g p t k |
| aspirated-stop | p t k |
| unaspirated-stop | b d g |
| anterior | b d p t m n f l z c s |
| coronal | d t n l z c |
| syllabic | aa i e o yu oe eo a aai aau ai au ei oi ou ui iu m ng |
| syllabic-consonant | m ng |
| syllabic-vowel | aa i e o yu oe eo a aai aau ai au ei oi ou ui iu |
| voiced | aa i u e o yu oe eo a eu aai aau ai au ei oi ou eoi ui iu m n ng l w j |
| unvoiced | b d g p t k f h z c s |
| vowel | aa i u e o yu oe eo a eu aai aau ai au ei oi ou eoi ui iu |
| monophthong | aa i u e o yu oe eo a |
| diphthong | eu aai aau ai au ei oi ou eoi ui iu |
| front-diphthong | aai ai ei oi eoi ui |
| back-diphthong | eu aau au ou iu |
| rounded vowel | u o yu oe eo |
| unrounded vowel | aa i e a |
| high-vowel | i u yu |
| mid-vowel | e o oe eo |
| low-vowel | aa a |
| front-vowel | i e yu oe |
| central-vowel | eo a |
| back-vowel | aa u o |

Referring now to FIG. 8, a diagram 810 illustrating a mixed-language speech recognition technique for implementing dictionary 214 (FIG. 2) is shown, in accordance with one embodiment of the present invention. In alternate embodiments, the present invention may readily perform speech recognition using various other elements or techniques in addition to, or instead of, those elements or techniques discussed in conjunction with the FIG. 8 embodiment.

In accordance with the present invention, diagram 810 shows several different dictionary entry categories that may advantageously be incorporated when designing dictionary 214. In the FIG. 8 embodiment, dictionary 214 may include, but is not limited to a Cantonese category 814, an English category 816, a mixed Cantonese-English category 818, and a borrowed English category 820.

In the FIG. 8 embodiment, Cantonese category 814 may include any appropriate words and phrases selected from the Cantonese language. In diagram 810, an example of Cantonese category 814 is the phrase "sik6 m5 sik6 dil je2 aa3" which may be translated as the English question "Are you hungry?" Similarly, English category 816 may include any appropriate words and phrases selected from the English language. However, words and phrases from English category 816 may typically require an English-Cantonese pronunciation conversion procedure to convert the English pronunciation into a corresponding Cantonese pronunciation. This English-Cantonese pronunciation conversion procedure may be based upon appropriate phonological processes in which a native speaker maps the pronounciation of a foreign word into his or her native language. The foregoing English-Cantonese pronunciation conversion procedure is further discussed below in conjunction with FIG. 9. In diagram 810, an example of English category 816 is the command "SIT".

In the FIG. 8 embodiment, Cantonese-English category 818 may include any appropriate words selected from both the Cantonese language and the English language. In accordance with the present invention, these words from the two different languages may then be combined to create single entries 512 in dictionary 214. However, as discussed above, words from the English language may require an English-Cantonese pronunciation conversion procedure to convert the English pronunciation into a corresponding Cantonese pronunciation. In diagram 810, an example of Cantonese-English category 818 is the phrase "caa4 ngo5 ge3 EMAIL" which may be translated as the English command "Check my email."

In the FIG. 8 embodiment, borrowed English category 820 may include any appropriate words from the English language that have typically become incorporated into daily usage by Cantonese speakers. Words in the borrowed English category 820 typically exhibit pronunciation variations from standard English pronunciations of these same words. In practice, words from borrowed English category 820 may also be combined with words from the Cantonese language and/or the English language to create a single entry 512 for dictionary 214. In diagram 810, an example of borrowed English category 820 is the phrase "haa1 lou2" which may be translated as the English word "hello."

The present invention provides a compact method for representing multi-language dictionary 214 by utilizing a single optimized phone set 710. The present invention thus utilizes the foregoing improved mixed-language speech recognition technique for implementing dictionary 214 to thereby provide an accurate representation of the spoken Cantonese language which typically incorporates various words and phrases from the English language.

Referring now to FIG. 9, a diagram 910 illustrating an English-Cantonese pronunciation conversion procedure is shown, in accordance with one embodiment of the present invention. In alternate embodiments, the present invention may readily perform speech recognition using various other elements or procedures in addition to, or instead of, those elements or procedures discussed in conjunction with the FIG. 9 embodiment.

In accordance with the present invention, each entry 512 in dictionary 214 may be represented by a corresponding phone string from optimized phone set 710. However, because of the compact size of optimized phone set 710 and pronunciation differences between English and Cantonese, certain standard sounds from the English language may not be present in optimized phone set 710. The present invention may therefore perform the foregoing English-Cantonese pronunciation conversion procedure upon such English words, in order to convert the standard English phones into corresponding Cantonese phones from optimized phone set 710.

In diagram 910, an example of the English-Cantonese pronunciation conversion procedure is provided using the English word "EMAIL" as used above in the FIG. 8 example of borrowed English category 820. In the FIG. 9 example, row 914 shows the original English word "EMAIL". Row 916 of diagram 910 shows a phonetic representation "i m ei l" of the English pronunciation of "EMAIL". Finally, row 918 of diagram 910 shows a phonetic representation "i m eu" of the Cantonese pronunciation of the English word "EMAIL". The phonetic representation "i m eu" of the Cantonese pronunciation of the English word "EMAIL" may thus advantageously be represented using optimized phone set 710.

The invention has been explained above with reference to preferred embodiments. Other embodiments will be apparent to those skilled in the art in light of this disclosure. For example, the present invention may readily be implemented using configurations and techniques other than those described in the preferred embodiments above. Additionally, the present invention may effectively be used in conjunction with systems other than those described above as the preferred embodiments. Therefore, these and other variations upon the preferred embodiments are intended to be covered by the present invention, which is limited only by the appended claims.

What is claimed is:

1. A system for performing a speech recognition procedure, comprising:
a sound transducer device that captures and converts a spoken utterance into input speech data for performing said speech recognition procedure;
a recognizer configured to compare said input speech data to dictionary entries from a dictionary that is implemented by utilizing a mixed-language technique that incorporates multiple different languages into said dictionary entries, said dictionary being implemented to include dictionary entries that represent phone strings of a Cantonese language without utilizing corresponding tonal information as part of said phone strings; and
a processor configured to control said recognizer to thereby perform said speech recognition procedure to generate and output one or more recognized words as a speech recognition result.

2. The system of claim 1 wherein said input speech data includes Cantonese language data and English language data, said dictionary being configured to accurately represent a pre-determined recognition vocabulary for analyzing said Cantonese language data and said English language data.

3. The system of claim 1 wherein said recognizer and said processor are implemented as part of a consumer electronics device.

4. The system of claim 1 wherein said mixed-language technique of said dictionary improves recognition accuracy characteristics of said recognizer by recognizing said multiple different languages during said speech recognition procedure.

5. The system of claim 1 wherein each of said dictionary entries includes a command and an associated phone string that indicates pronunciation characteristics of said command.

6. The system of claim 5 wherein said recognizer compares said input speech data to Hidden Markov Models for said phone string from each of said commands in said dictionary to thereby select a recognized word.

7. The system of claim 1 wherein said dictionary is represented with an optimized phone set that is implemented with a phonetic technique to separately provide consonantal phones and vocalic phones, said optimized phone set being implemented in a compact manner to include only a minimum required number of said consonantal phones and said vocalic phones.

8. The system of claim 7 wherein said optimized phone set conserves processing resources and memory resources while performing said speech recognition procedure, said optimized phone set also reducing training requirements for performing a recognizer training procedure to initially implement said recognizer.

9. The system of claim 7 wherein said optimized phone set includes phones b, d, g, p, t, k, m, n, ng, f, l, h, z, c, s, w, j, cl, sil, aa, i, u, e, o, yu, oe, eo, a, eu, aai, aau, ai, au, ei, oi, ou, eoi, ui, and iu.

10. The system of claim 1 wherein said dictionary entries in said dictionary fall within at least two of a Cantonese category, an English category, a mixed Cantonese-English category.

11. The system of claim 10 wherein said Cantonese category includes words and phrases selected from a standard Cantonese language.

12. The system of claim 10 wherein said English category includes words and phrases selected from a standard English language.

13. The system of claim 12 wherein said words and said phrases from said English category require an English-Cantonese pronunciation conversion procedure to convert an English pronunciation into a corresponding Cantonese pronunciation.

14. The system of claim 10 wherein said Cantonese-English category includes combined phrases selected from both a standard Cantonese language and a standard English language.

15. The system of claim 14 wherein English words from said phrases of said Cantonese-English category require an English-Cantonese pronunciation conversion procedure to convert an English pronunciation into a corresponding Cantonese pronunciation.

16. The system of claim 10 further comprising a borrowed English category for said dictionary entries in said dictionary.

17. The system of claim 16 wherein said borrowed English category includes words from an English language that have become incorporated into a standard usage by Cantonese speakers.

18. The system of claim 1 wherein said dictionary entries of said dictionary are divided into a Cantonese category, an English category, and a mixed Cantonese-English category.

19. The system of claim 1 wherein said dictionary entries of said dictionary are divided into a Cantonese category, an English category, a mixed Cantonese-English category, and a borrowed English category.

20. A method for performing a speech recognition procedure, comprising the steps of:
providing a sound transducer device that captures and converts a spoken utterance into input speech data for performing said speech recognition procedure;
utilizing a recognizer for comparing said input speech data to dictionary entries from a dictionary that is implemented by utilizing a mixed-language technique that incorporates multiple different languages into said dictionary entries, said dictionary being implemented to include dictionary entries that represent phone strings of a Cantonese language without utilizing corresponding tonal information as part of said phone strings; and
controlling said recognizer with a processor to thereby perform said speech recognition procedure to generate and output one or more recognized words as a speech recognition result.

21. The method of claim 20 wherein said input speech data includes Cantonese language data and English language data, said dictionary being configured to accurately represent a pre-determined recognition vocabulary for analyzing said Cantonese language data and said English language data.

22. The method of claim 20 wherein said recognizer and said processor are implemented as part of a consumer electronics device.

23. The method of claim 20 wherein said mixed-language technique of said dictionary improves recognition accuracy characteristics of said recognizer by recognizing said multiple different languages during said speech recognition procedure.

24. The method of claim 20 wherein each of said dictionary entries includes a command and an associated phone string that indicates pronunciation characteristics of said command.

25. The method of claim 24 wherein said recognizer compares said input speech data to Hidden Markov Models for said phone string from each of said commands in said dictionary to thereby select a recognized word.

26. The method of claim 20 wherein said dictionary is represented with an optimized phone set that is implemented with a phonetic technique to separately provide consonantal phones and vocalic phones, said optimized phone set being implemented in a compact manner to include only a minimum required number of said consonantal phones and said vocalic phones.

27. The method of claim 26 wherein said optimized phone set conserves processing resources and memory resources while performing said speech recognition procedure, said optimized phone set also reducing training requirements for performing a recognizer training procedure to initially implement said recognizer.

28. The method of claim 26 wherein said optimized phone set includes phones b, d, g, p, t, k, m, n, ng, f, l, h, z, c, s, w, j, cl, sil, aa, i, u, e, o, yu, oe, eo, a, eu, aai, aau, ai, au, ei, oi, ou, eoi, ui, and iu.

29. The method of claim 26 wherein said optimized phone set includes only phones b, d, g, p, t, k, m, n, ng, f, l, h, z, c, s, w, j, cl, sil, aa, i, u, e, o, yu, oe, eo, a, eu, aai, aau, ai, au, ei, oi, ou, eoi, ui, and iu.

30. The method of claim 20 wherein said dictionary entries in said dictionary fall within at least two of a Cantonese category, an English category, a mixed Cantonese-English category.

31. The method of claim 30 wherein said Cantonese category includes words and phrases selected from a standard Cantonese language.

32. The method of claim 30 wherein said English category includes words and phrases selected from a standard English language.

33. The method of claim 32 wherein said words and said phrases from said English category require an English-Cantonese pronunciation conversion procedure to convert an English pronunciation into a corresponding Cantonese pronunciation.

34. The method of claim 30 wherein said Cantonese-English category includes combined phrases selected from both a standard Cantonese language and a standard English language.

35. The method of claim 34 wherein English words from said phrases of said Cantonese-English category require an English-Cantonese pronunciation conversion procedure to convert an English pronunciation into a corresponding Cantonese pronunciation.

36. The method of claim 30 further comprising a borrowed English category for said dictionary entries in said dictionary.

37. The method of claim 36 wherein said borrowed English category includes words from an English language that have become incorporated into a standard usage by Cantonese speakers.

38. The method of claim 20 wherein said dictionary entries of said dictionary are divided into a Cantonese category, an English category, and a mixed Cantonese-English category.

39. The method of claim 20 wherein said dictionary entries of said dictionary are divided into a Cantonese category, an English category, a mixed Cantonese-English category, and a borrowed English category.

40. A system for performing a speech recognition procedure, comprising:

means for capturing and converting a spoken utterance into input speech data for performing said speech recognition procedure;

means for comparing said input speech data to dictionary entries from a dictionary that is implemented by utilizing a mixed-language technique that incorporates multiple different languages into said dictionary entries, said dictionary being implemented to include dictionary entries that represent phone strings of a Cantonese language without utilizing corresponding tonal information as part of said phone strings; and means for controlling said means for comparing to thereby perform said speech recognition procedure to generate and output one or more recognized words as a speech recognition result.

* * * * *